United States Patent [19]

Burel

[11] Patent Number: 5,430,777
[45] Date of Patent: Jul. 4, 1995

[54] NEUTRON DETECTION DEVICE FOR MEASURING THE POWER OF A NUCLEAR REACTOR

[75] Inventor: Jean-Pierre Burel, Meylan, France

[73] Assignee: Merlin Gerin, France

[21] Appl. No.: 140,471

[22] Filed: Oct. 25, 1993

[30] Foreign Application Priority Data

Nov. 4, 1992 [FR] France ............... 92 13356

[51] Int. Cl.⁶ ............................................. G01T 3/00
[52] U.S. Cl. ................................................ 376/154
[58] Field of Search ........................ 376/153–155; 250/391, 392, 390.01–390.06

[56] References Cited

U.S. PATENT DOCUMENTS

| | | |
|---|---|---|
| 2,519,007 | 8/1950 | Wilson ................ 250/390.01 |
| 2,521,656 | 9/1950 | Segre et al. ............... 250/391 |
| 2,556,768 | 6/1951 | McKibben ............... 376/154 |
| 2,596,080 | 5/1952 | Raper et al. ......... 250/390.01 |
| 2,616,052 | 10/1952 | Hurst ................... 250/390.01 |
| 2,920,204 | 1/1960 | Youmans . |
| 3,102,198 | 8/1963 | Bonner ................... 250/392 |
| 3,201,586 | 8/1965 | Booth ..................... 376/154 |
| 3,546,455 | 12/1970 | Porges ..................... 250/391 |
| 3,854,048 | 12/1974 | Runge et al. ......... 250/390.01 |
| 4,074,136 | 2/1978 | Heinzelmann et al. ..... 250/392 |
| 4,241,253 | 12/1980 | Allen et al. .......... 250/390.01 |
| 4,390,786 | 6/1983 | Kopp et al. .......... 250/390.01 |
| 4,463,264 | 7/1984 | Young et al. . |
| 4,645,935 | 2/1987 | Salaita ..................... 250/391 |
| 4,682,036 | 7/1987 | Wakayama et al. ...... 250/390.01 |
| 5,098,639 | 3/1992 | Bacconnet et al. .......... 376/154 |
| 5,141,709 | 8/1992 | Gaussa, Jr. et al. ........ 376/154 |
| 5,180,917 | 1/1993 | Wraight .................... 250/392 |
| 5,192,490 | 3/1993 | Burel ....................... 376/154 |
| 5,264,702 | 11/1993 | Mihalezo ............... 250/390.01 |

FOREIGN PATENT DOCUMENTS

| | | |
|---|---|---|
| 0461015 | 12/1991 | European Pat. Off. . |
| 2287704 | 5/1976 | France . |
| 2670301 | 6/1992 | France . |
| 1210093 | 8/1966 | Germany . |

*Primary Examiner*—Behrend E. Harvey
*Attorney, Agent, or Firm*—Parkhurst, Wendel & Rossi

[57] ABSTRACT

This neutron detector device includes a containment inside of which there is mounted a detector and which contains a neutral gas. The detector is formed by a fission type chamber comprising a cylindrical-shaped external electrode, coated with a lining of uranium in metal form, enriched as isotope 235, and a cylindrical-shaped internal electrode coaxial to the external electrode. The containment is of annular shape and arranges a cylindrical center space open at both ends to house a moderator to slow down the fast neutrons with great efficiency with respect to detection. The present invention provides an advantage of making it easy to replace the moderator. It is favorable to use cylindrical electrodes of large diameter thus increasing the sensitivity.

7 Claims, 3 Drawing Sheets

NEUTRON DETECTION DEVICE FOR MEASURING THE POWER OF A NUCLEAR REACTOR

BACKGROUND OF THE INVENTION

The invention relates to a neutron detection device designed for measuring the neutron fluence rate outside the core of a nuclear reactor, this device comprising on the one hand at least one detector formed by an uranium-lined fission type ionization chamber having a positive electrode polarized by a positive voltage source and delivering an output signal applied to an electronic measuring circuit and a negative electrode connected to ground, this detector being housed in a containment containing a gas or a mixture of gases, and on the other hand at least one moderator element to slow down the fast neutrons.

A device of this type is described notably by the French Patent application published under the No. 2,670,301 filed by the applicant. In this device the moderator element is formed by an element made of highly hydrogenated material such as for example high-density polyethylene, placed inside the containment.

This material happens to be degraded by the action of radiation, which is liable to modify the functional characteristics considerably.

SUMMARY OF THE INVENTION

The object of the invention is to achieve a detection device, in which the moderator element can be easily replaced without any operation taking place inside the containment containing the detector proper.

According to a preferred embodiment, this containment is arranged around an open center space in which said moderator element is disposed. This space can have a cylindrical shape of circular cross-section and said containment can bound a cylindrical volume of annular cross-section which completely surrounds this open center space. The containment is advantageously bounded by two annular flat components disposed parallel to one another which form its two ends and by two cylindrical side walls disposed coaxially.

The moderator element is preferably formed by at least one cylindrical block of circular cross-section made of hydrogenated material, this cross-section having a diameter at least equal to that of said center space.

BRIEF DESCRIPTION OF THE DRAWINGS

Other advantages and features will become more clearly apparent from the following description of a preferred embodiment and of various alternative embodiments of the invention, given as non-restrictive examples only and represented in the accompanying drawings in which.

DESCRIPTION OF THE PREFERRED EMBODIMENT

Figure 1:
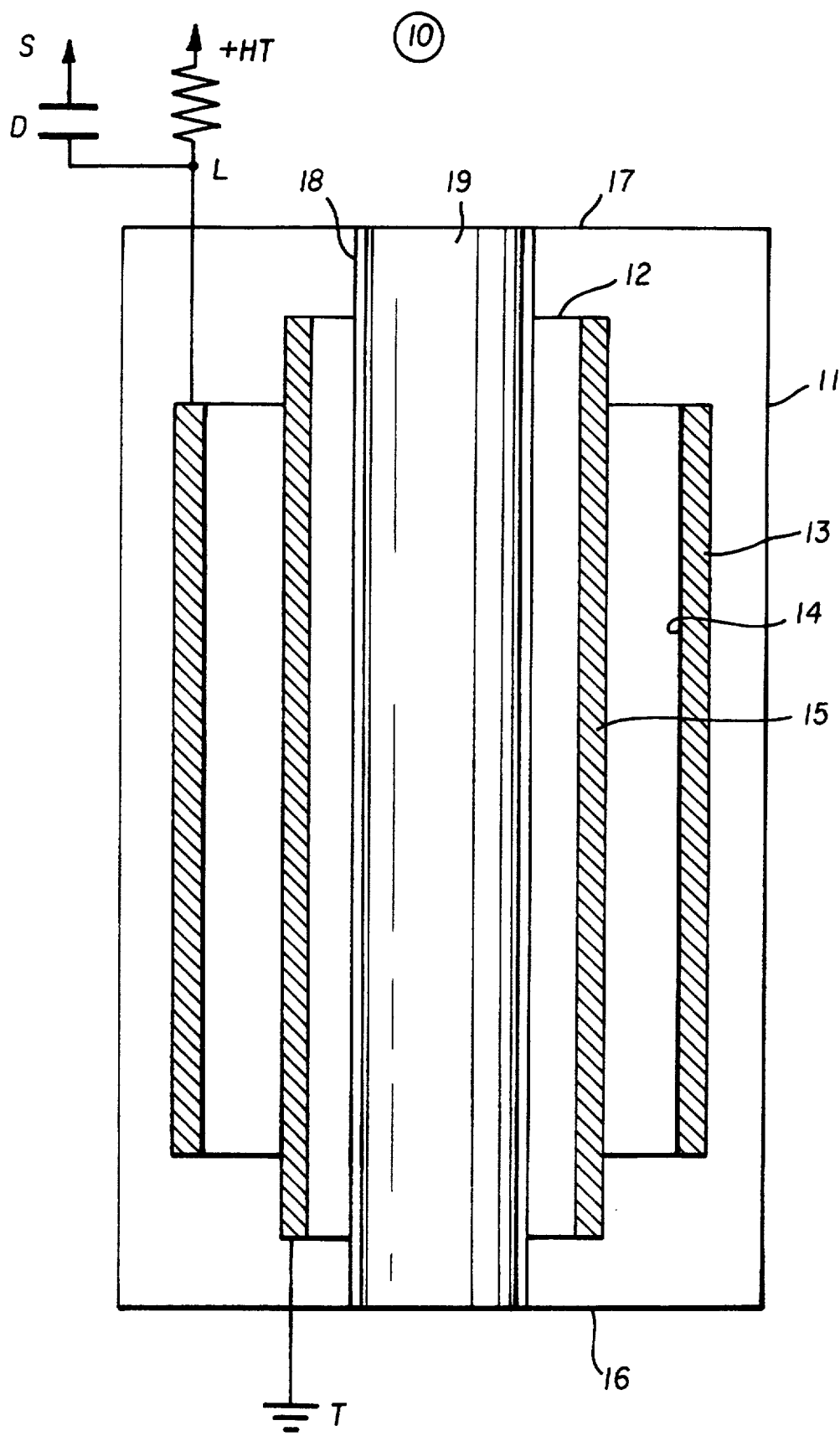
FIG. 1 represents a first embodiment of the device according to the invention seen in axial cross-section.

Referring to FIG. 1, the neutron detection device 10 comprises a containment 11 inside of which there is mounted a detector 12 and which contains gas, for example a mixture of argon and nitrogen. This detector 12 is formed by a fission type chamber, comprising an external electrode 13 formed by a cylindrical-shaped tubular component, provided with an internal coating 14 made of a lining of enriched uranium as isotope 235 in metal form, and an internal electrode 15 also formed by a tubular component, arranged coaxially with respect to said external electrode. The external electrode is connected to a positive high voltage source $+HT$ and the internal electrode is connected to the ground T. An output signal S in the form of current pulses or fluctuations is collected on a branch D of the cable L connecting the external electrode to the high voltage source $+HT$.

The containment 11 is bounded by two coaxially arranged cylindrical side walls respectively external and internal and by two annular flat components respectively 16 and 17 welded to the opposite ends of these side walls. These components are preferably made of metal and are hermetically sealed. The open cylindrical space 18 bounded by the internal side wall of this containment is occupied by a cylindrical block made of highly hydrogenated material, such as for example high density polyethylene or any other equivalent material, which constitutes a moderator 19 whose role consists in slowing down the fast neutrons. The diameter of this block is less than or equal to the diameter of the cylindrical space 18 and the block is secured by any means, retaining clamps, flanges etc., in this cylindrical space 18 which is open at both ends and which does not have any communication with the containment 11.

It is state-of-the-art to use detection devices with two detection levels, comprising a high-sensitivity fission chamber and a low-sensitivity fission chamber.

Figure 2:
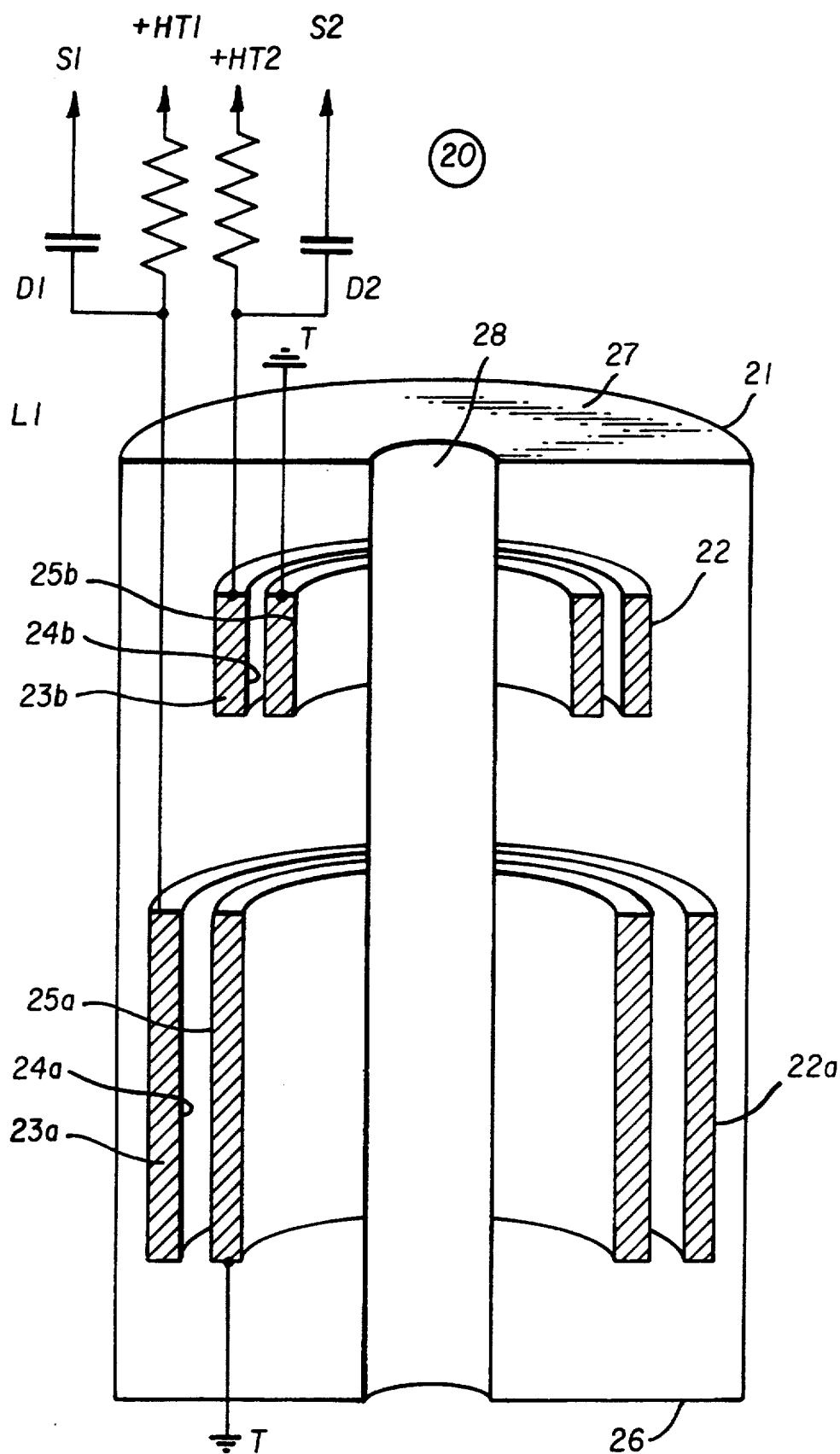
FIG. 2 represents another embodiment of the device according to the invention seen in perspective and cut according to a mid-plane.
Figure 3:
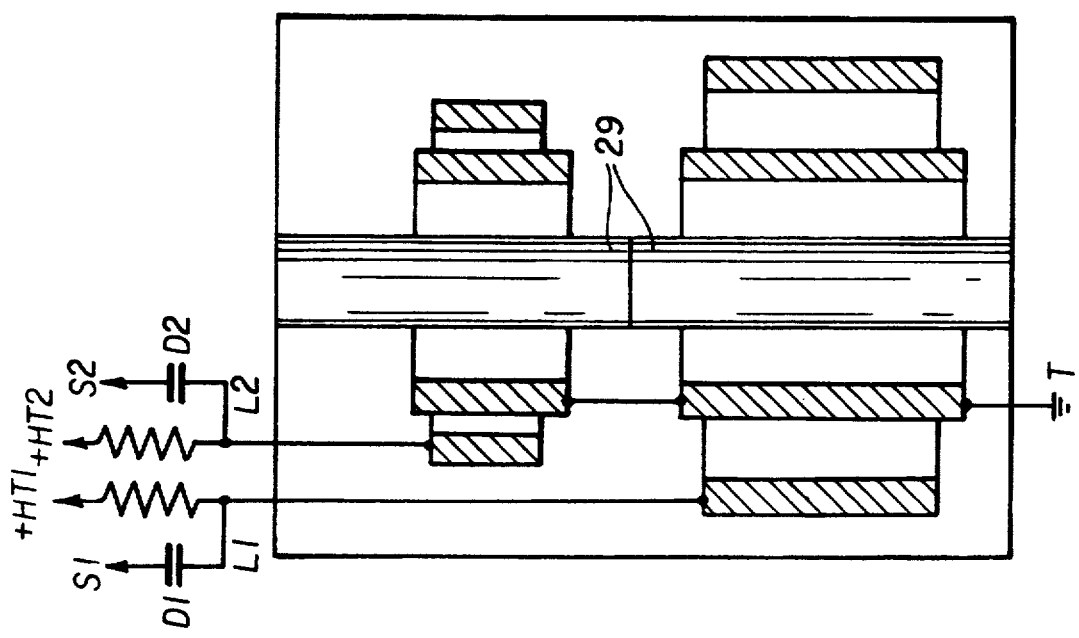
FIG. 3 represents a partial view in axial cross-section of the embodiment according to FIG. 2.

FIGS. 2 and 3 represent an embodiment of a detection device of this type which also meets the objectives of the invention set out above. The detection device 20 comprises a containment 21 inside of which there are mounted a first detector 22a and a second detector 22b. The first detector comprises an external electrode 23a formed by a cylindrical-shaped tubular component coated on its internal face with a lining 24a of highly enriched uranium isotope 235 in metal form, and an internal electrode 25a also formed by a cylindrical-shaped tubular component, arranged coaxially with respect to the external electrode. As before, the external electrode is connected to a positive high voltage source $+HT_1$ and the internal electrode is connected to the ground T. An output signal $S_1$ in the form of current pulses or fluctuations is collected on a branch $D_1$ of the cable $L_1$ connecting the external electrode to the high voltage source $+HT_1$.

The second detector 22b comprises an external electrode 23b formed by a cylindrical-shaped tubular component, coated on its internal face with a lining 24b of enriched uranium 235 and an internal electrode 25b also formed by a cylindrical-shaped tubular component arranged coaxially with respect to the external electrode. The external electrode is connected to a positive high voltage source $+HT_2$ and the internal electrode is connected to the ground T. An output signal $S_2$ in the form of current pulses or fluctuations is collected on a branch $D_2$ of the cable $L_2$ connecting the external electrode to the high voltage source $+HT_2$.

As in the embodiment described with reference to FIG. 1, the containment is bounded by two coaxial cylindrical side walls and is closed at both ends by two annular flat components 26 and 27. The open internal cylindrical space 28, bounded by the internal side wall of the cylindrical-shaped containment of circular cross-section is designed to receive one or more cylindrical blocks 29 (see FIG. 3) made of a highly hydrogenated material which constitutes a moderator slowing down the fast neutrons. This block could naturally be made of a single part or from several components juxtaposed or fitted together. In this case the nature of the material could be different for each component so as to perform slowing of fast neutrons with improved efficiency. In this respect, a sandwich construction or a fitting together of coaxial components having different densities could be envisaged.

Figure 4:
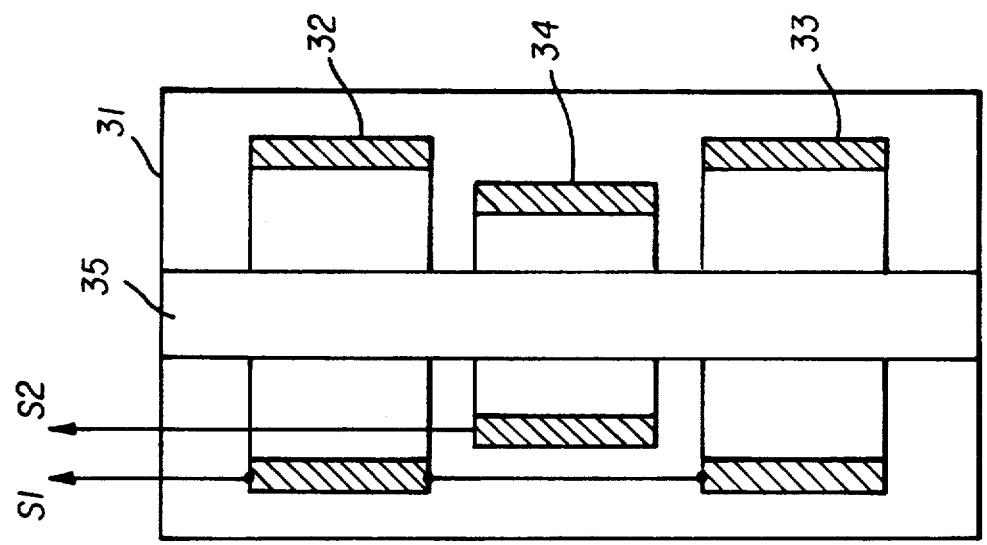
FIG. 4 represents an axial cross-sectional view of an alternative embodiment in which the high-sensitivity fission chamber is doubled up.

FIG. 4 represents a schematic view of an alternative embodiment according to which the high-sensitivity fission chamber is doubled up. The device again comprises a containment 31 similar to those of the embodiments described above which contains in this case a first detector 32 electrically coupled to a second detector 33 identical to the previous one. These two detectors are arranged on each side of a third detector 34. All these detectors comprise coaxial annular electrodes, which are achieved in a similar manner to that described with reference to the constructions illustrated by FIGS. 1 to 3. The containment 31 defines in its center part a cylindrical space 35 open at both ends, which is designed to contain a material slowing down fast neutrons, in the form of one or more blocks of suitable material such as for example high-density polyethylene.

The two detectors 32 and 33, coupled in series, deliver a first signal $S_1$ and the detector 34 delivers a signal $S_2$. Representation of the connections is schematic. In practice these signals are collected as before on a branch of the connecting cable to a positive high voltage source.

This "doubling-up" principle could be applied to all the detectors and it would be envisageable to provide any number of high-sensitivity detectors and lower-sensitivity detectors in a single containment.

In all these constructions, the components for slowing of the fast neutrons are stored outside the containment and can therefore be replaced without it being necessary to access the inside of this chamber.

What is claimed is:

1. A neutron detection device for measuring a neutron fluence rate outside a core of a nuclear reactor, comprising:

a sealed containment comprising a housing having an inner cylindrical wall, an outer cylindrical wall coaxially surrounding the inner cylindrical wall, and annular end caps interconnecting the inner and outer cylindrical walls to each other to form a sealed annular volume within the inner and outer cylindrical walls and the annular end caps, said housing forming an axial bore sealed from the sealed annular volume and extending along the inner cylindrical wall and being open through at least one hole in the annular end caps;

at least one gas contained in the sealed containment;

at least one detector contained in said housing, said at least one detector comprising a fission ionization chamber which includes a positive cylindrical electrode and a negative cylindrical electrode, said electrodes being coaxial with each other and surrounding said axial bore;

a positive voltage source for polarizing said positive electrode and an electronic measuring circuit for receiving an input signal from said positive electrode; and a moderator for slowing down fast neutrons, said moderator comprising at least one cylindrical block comprised of hydrogenated material, said at least one cylindrical block having a diameter not greater than a diameter of said axial bore and being secured in said bore via securing means such that said moderator is positioned outside said sealed annular volume.

2. The device of claim 1, further comprising a metallic uranium compound deposited on said positive electrode.

3. The device of claim 1, wherein said securing means comprises retaining clamps.

4. A neutron detection device for measuring a neutron fluence rate outside a core of a nuclear reactor, comprising:

a sealed containment comprising a housing having an inner cylindrical wall, an outer cylindrical wall coaxially surrounding the inner cylindrical wall, and annular end caps interconnecting the inner and outer cylindrical walls to each other to form a sealed annular volume within the inner and outer cylindrical walls and the annular end caps, said housing forming an axial bore sealed from the sealed annular volume and extending along the inner cylindrical wall and being open through at least one hole in the annular end caps;

at least one gas contained in said sealed containment;

a low-sensitivity detector and a high-sensitivity detector, said low-sensitivity detector being axially spaced apart from said high-sensitivity detector, each detector comprising a fission ionization chamber which includes a positive cylindrical electrode and a negative cylindrical electrode, said electrodes being coaxial with each other and surrounding said axial bore;

a positive voltage source for polarizing the positive electrodes and an electronic measuring circuit for receiving an input signal from the positive electrodes; and a moderator for slowing down fast neutrons, said moderator comprising at least one cylindrical block comprised of hydrogenated material, said at least one cylindrical block having a diameter not greater than a diameter of said axial bore and being secured in said bore via securing means such that said moderator is positioned outside said sealed annular volume.

5. The device of claim 4, wherein said high-sensitivity detector comprises at least two detector components connected to each other in series.

6. The device of claim 5, wherein said low-sensitivity detector is disposed between two of said at least two detector components.

7. The device of claim 6, wherein said low-sensitivity detector comprises at least two detector components connected to each other in series.

* * * * *